Dec. 13, 1927.

P. TORCHIO

ELECTRIC DISTRIBUTION SYSTEM

Filed Oct. 16, 1924

1,652,261

Inventor
Philip Torchio
By his Attorney

Patented Dec. 13, 1927.

1,652,261

UNITED STATES PATENT OFFICE.

PHILIP TORCHIO, OF BRONXVILLE, NEW YORK, ASSIGNOR TO THOMAS E. MURRAY, OF BROOKLYN, NEW YORK.

ELECTRIC DISTRIBUTION SYSTEM.

Application filed October 16, 1924. Serial No. 743,948.

My invention aims to provide a new system of distribution adapted particularly to the circuits of polyphase alternating current installations, but adapted also to the different legs of direct current or other circuits.

The accompanying drawings illustrate a three-phase alternating current system and the detail description is limited to an underground distribution, in which the advantages of the improvement are probably greatest; though the arrangement is applicable also to any number of phases and to overhead distribution.

Figures 1, 2:
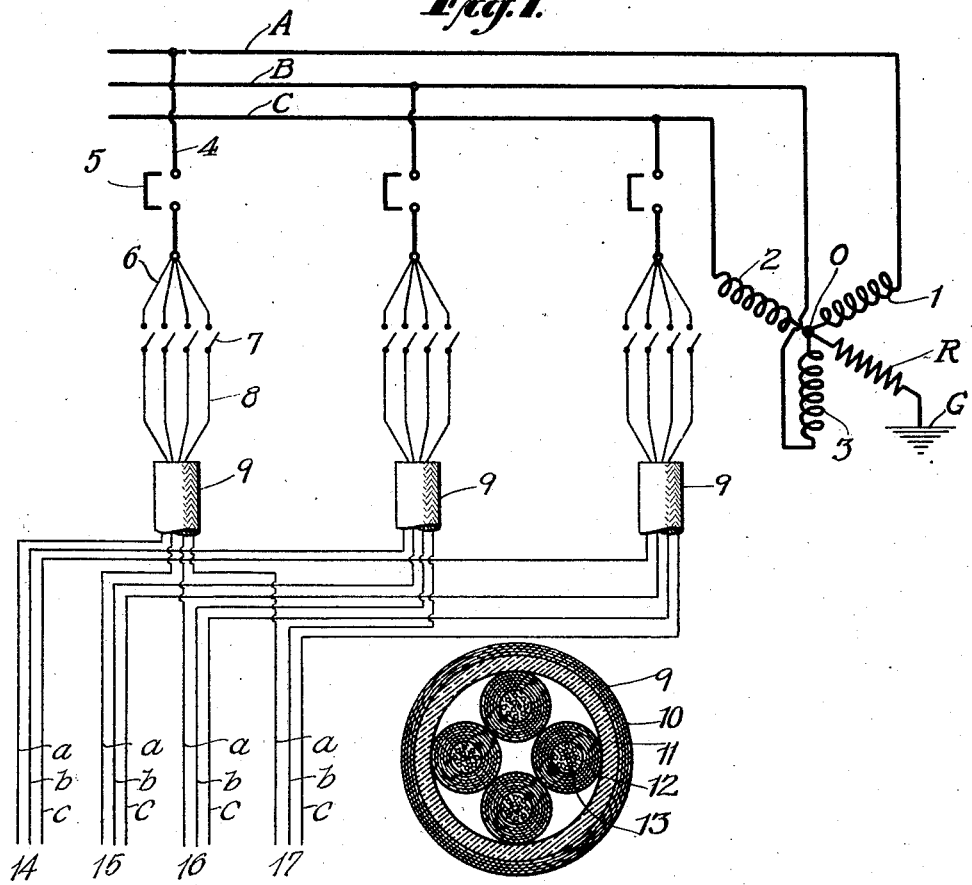
Fig. 1 is a diagram of the elementary parts of a three-phase system.
Fig. 2 is a cross-section of one of the cables.

Referring to the embodiment of the invention illustrated, the three lines 1, 2 and 3 lead from a neutral 0 to the busses A, B and C respectively of the three different phases. The neutral 0 is connected by a resistance R to the ground G. The resistance R will limit the current through a fault or ground of any phase to a small amount; that is to a small percentage of the current that would flow through a short circuit between any two phases.

From each of the busses A, a branch 4 leads to a circuit breaker 5 of large rupturing capacity and thence to four insulated leads 6 in each of which there is a circuit breaker 7 of comparatively small rupturing capacity, whence four insulated leads 8 connect with four conductors in a cable indicated as a whole at 9.

Each of the four-conductor cables is of the construction shown in Fig. 2, each conductor being insulated from the others. The cable has an enveloping sheath 10 of lead or other material within which is a heavy insulation 11 adapted to withstand the full working potential of the three-phase system to ground. A separate insulation 12 surrounds each of the separate conductors 13. Under normal conditions there will be no practical difference of potential between the four conductors in one cable, and, therefore, the insulation around each conductor may be of minimum thickness.

There is no possibility of a short circuit occurring from the conductors 13 of one phase to similar conductors in other phases. Any fault possible in one of said conductors would create a short circuit to ground which would be limited to a comparatively small amount by reason of the connection through the resistance R to the ground G, Fig. 1. Therefore, the switches 7 can be made of comparatively small rupturing capacity, giving a great saving in cost of circuit breakers compared with the ordinary arrangement which requires breakers of large rupturing capacity on each branch of a circuit.

By combining four conductors in each of the three cables, I provide a sufficient number of conductors to make up four independent feeders; that is feeders of three different phases for four separate load circuits. The four separate load circuits are shown at 14, 15, 16, and 17. Each has three wires $a, b, c$; all the wires $a$ coming from one of the four-conductor cables 9, all the wires $b$ from another cable 9 and all the wires $c$ from the third cable 9. And, because the conductors in any cable are all on the same phase, with a potential to ground which is only a fraction (about 58%) of the potential between phases, the insulation for each conductor is lighter than the insulation of the conductors in the standard three-conductor cables with one conductor on each phase. Hence, in outside diameter of the cable, and in total value of the materials therein, each of these four-conductor cables is practically no larger or more costly than the corresponding standard three-conductor cables referred to. Therefore, these four-conductor cables can be installed in subway ducts of the same size as those required for the standard three-conductor cables, and three four-conductor cables will be equivalent to four of the standard cables.

The invention as illustrated, therefore, will produce a saving of 25% in the ducts required to distribute a given amount of power. For similar reasons three of the cables of the present invention will give the same service as four standard three-conductor cables and will save approximately 25% in the cost of cables. When the current is distributed overhead, the cost of pole lines is similarly diminished.

In the transmission and distribution of high tension polyphase current from large power plants, one of the elements of great cost is the circuit breakers on the feeders. Usually each branch circuit is composed of three separate feeders one from each bus, and each feeder has to carry a circuit breaker of sufficient capacity to interrupt the immense amount of energy that flows from the main bus bars when a fault develops between phases of the feeder; which means, for four branch circuits, twelve large capacity circuit breakers.

My improved arrangement requires only three such large capacity breakers supplemented by twelve breakers of capacity so much smaller as to reduce the total cost of breakers considerably.

Besides the saving in the cost of switches, ducts and cables, there are other incidental advantages in the invention. The lighter insulation means a lower operating copper temperature in the conductors.

With the standard three-conductor cables, the load is at a maximum on each of the cables at the same time. With the four-conductor cable of this invention, there will generally be a diversity of loads on the different cables at any time; and consequently the maximum temperature will be less than in the case of the standard cables. The lower temperature conditions thus obtained by the invention tend to prolong the life of the insulation.

For the sake of simplicity, I have illustrated and described a four-conductor cable, but the invention is applicable to cables carrying a different number of conductors with an increased advantage in some cases. For alternating current systems, for example, the increasing of the number of conductors in a cable will theoretically carry the correspondingly increased economy. But there is a practical advantage in using four-conductors since a cable of this construction can be made of about the same size of the standard three-conductor cables and will fit the ducts and other parts of the system which are now designed for such a standard.

Though I have described with great particularity of detail certain embodiments of my invention, yet it will be understood that the invention is not restricted to the particular embodiments disclosed. Various modifications may be made by those skilled in the art without departure from the invention as defined in the following claims.

What I claim is:

1. An electric distribution system comprising busses, a neutral grounded through a limiting resistor, a branch from each bus, a plurality of leads from each branch and a cable for each branch carrying a corresponding plurality of conductors connected to said leads, each of which conductors is connected to a separate load circuit.

2. An electric distribution system comprising busses, a neutral grounded through a limiting resistor, a branch from each bus, a plurality of leads from each branch and a cable for each branch carrying a corresponding plurality of conductors connected to said leads, each of which conductors is connected to a separate load circuit, a comparatively large capacity breaker in each branch and a comparatively small capacity breaker in each lead.

3. An electric distribution system for polyphase alternating currents comprising busses for the different phases, a neutral grounded through a limiting resistor, a branch from each bus, a plurality of leads from each bus and a cable comprising a corresponding plurality of conductors connected to said leads, each of which conductors is connected to a separate load circuit.

4. An electric distribution system for polyphase alternating currents comprising busses for the different phases, a neutral grounded through a limiting resistor, a branch from each bus, a plurality of leads from each bus and a cable comprising a corresponding plurality of conductors connected to said leads, each of which conductors is connected to a separate load circuit, a comparatively large capacity breaker in each branch and a comparatively small capacity breaker in each lead.

5. An electric distribution system for a three-phase alternating current comprising three busses, a neutral grounded through a limiting resistor, three branches, one from each bus, four leads from each branch and a cable from each branch comprising four conductors one connected to each lead of said branch, each conductor being connected to a separate three-conductor load circuit.

6. An electric distribution system for a three-phase alternating current comprising three busses, a neutral grounded through a limiting resistor, three branches, one from each bus, four leads from each branch and a cable from each branch comprising four conductors one connected to each lead of said branch, each conductor being connected to a separate three-conductor load circuit.

7. An electric distribution system for a three-phase alternating current comprising three busses, a neutral grounded through a limiting resistor, three branches, one from each bus, four leads from each branch and a cable from each branch comprising four conductors one connected to each lead of said branch, each conductor being connected to a separate three-conductor load circuit, a comparatively large capacity breaker in each branch and a comparatively small capacity breaker in each lead.

In witness whereof, I have hereunto signed my name.

PHILIP TORCHIO.